Nov. 23, 1965    R. R. PALMISANO    3,219,048
VORTEX FLOW CONTROL VALVE
Filed May 22, 1963    2 Sheets-Sheet 1
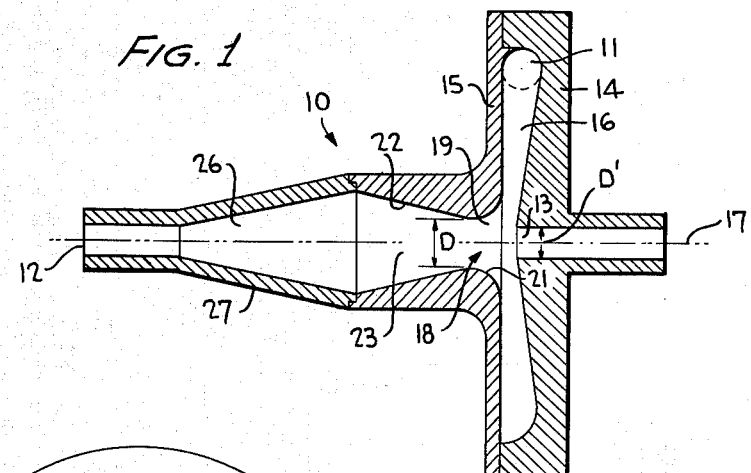
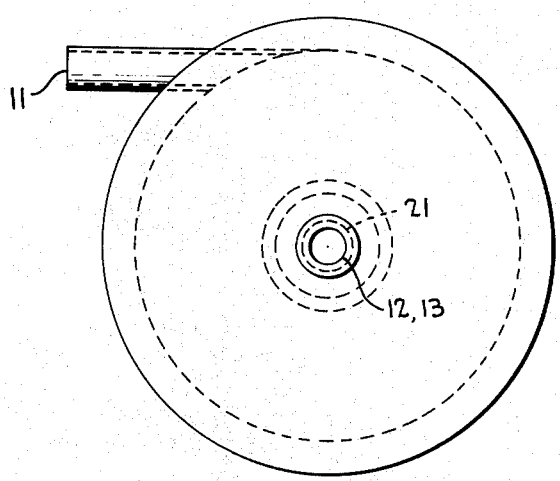
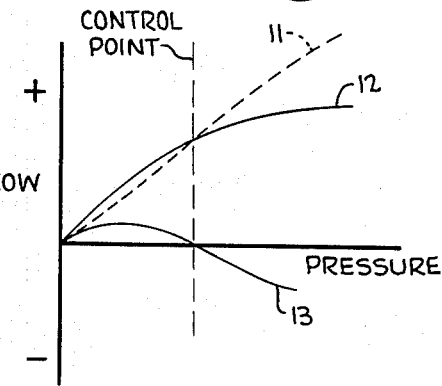
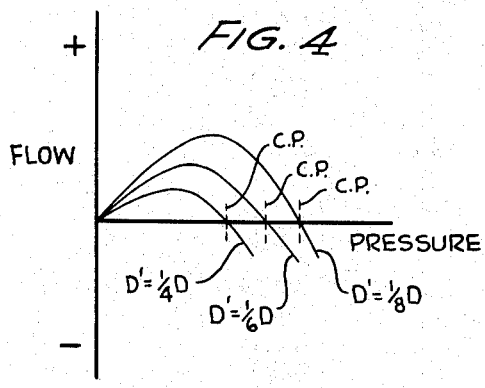
INVENTOR,
R. RICHARD PALMISANO

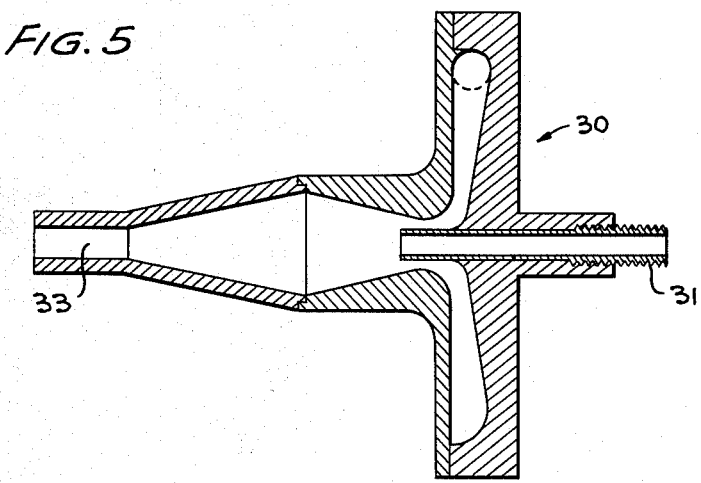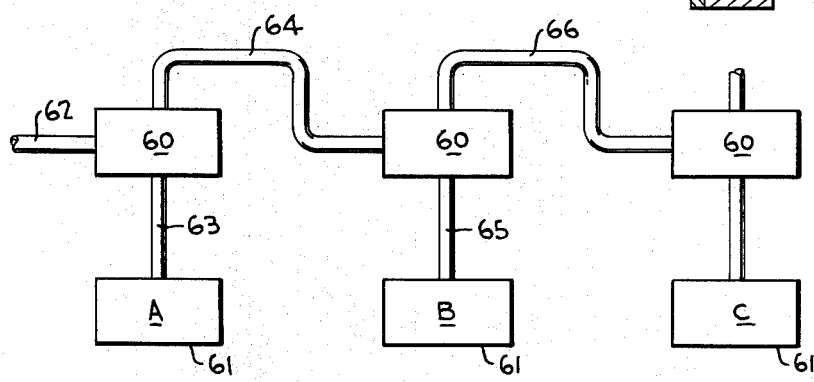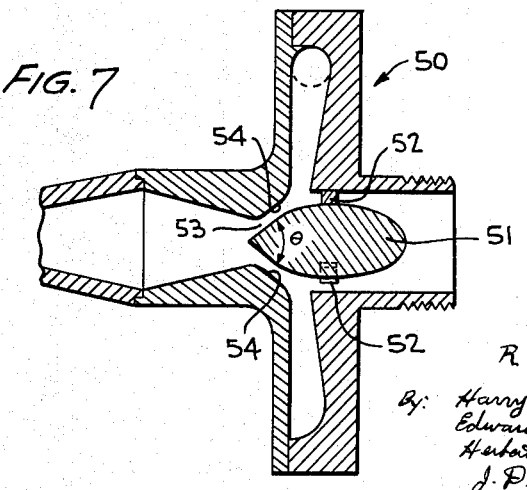

3,219,048
VORTEX FLOW CONTROL VALVE
Rosso Richard Palmisano, Bethesda, Md., assignor to the United States of America as represented by the Secretary of the Army
Filed May 22, 1963, Ser. No. 282,522
3 Claims. (Cl. 137—81.5)
(Granted under Title 35, U.S. Code (1952), sec. 266)

The invention described herein may be manufactured and used by or for the Government of the United States of America for governmental purposes without the payment to me of any royalty thereon.

This invention relates to fluid valves, and more particularly to a no moving part vortex control valve.

In fluid systems the performance, cost, and reliability of the system are all to some measure interrelated, and to some extent in a favorable way. There is no trouble with parts that are not there, and generally, the cost of a component is related to the number of parts it has. The phrase "no moving parts" is a lofty objective.

An object of this invention is, therefore, to provide a novel fluid valve having no moving parts.

Another object of this invention is to provide a fluid relief valve having no moving parts.

A further object of this invention is to provide a novel no moving part fluid relief valve, having a low loss when the direction of flow is from the input to the output, and a high loss when the direction of flow is from the output to the input.

A still further object of the present invention is to provide a no moving part valve which can provide stable proportional flow.

An additional object of this invention is to provide a no moving part fluid valve which favors the flow of fluid in a preferred direction, within predetermined limits of flow.

Another object of this invention is to provide novel, efficient, vacuum converter. That is, a novel device which efficiently creates a vacuum when energized by a fluid pressure.

Still another object of this invention is to provide a novel, no-moving-part, back pressure valve.

These and other objects of the present invention are accomplished by means of a novel vortex control valve. Fluid is introduced at an input port where means are provided to impart vortical motion to the fluid. Radially displaced from the input is a vortical outlet orifice, which forms the throat of a diffuser section. The valve outlet is a continuation of this diffuser section. Axially aligned with the vortex outlet orifice, and on the side away from the diffuser section, is a relief port. When a fluid is introduced at the input it will exit at the output. When the rate of fluid input exceeds the capability of the output to accommodate the fluid flow the excess fluid will flow out of the relief port.

The specific nature of the invention, as well as other objects, uses and advantages thereof, will clearly appear from the following description and from the accompanying drawings, in which:

FIG. 1 is a cross-sectional view along the longitudinal axis, and on a plane through such axis, of one embodiment of this invention;

FIG. 2 is an end view of the embodiment shown in FIG. 1;

FIG. 3 is a plot of idealized characteristic flow curves of the valve of this invention;

FIG. 4 is a graph showing the effect of relief port size;

FIG. 5 is an alternate embodiment of the valve shown in FIG. 1;

FIG. 6 is a partial sectional view of another embodiment of the vortex control valve of this invention; and FIG. 7 is a schematic drawing of a sequencing operation which can be performed with the valve of this invention.

FIG. 1 shows a vortex control valve 10 constructed in accordance with the teachings of this invention. The valve 10 has a tangential inlet 11, an outlet 12, and a relief port 13. Formed between a backplate 14 and a front plate 15, is an annular vortical chamber 16. Radially displaced from the inlet 11, and coaxial with a longitudinal center line 17 of the valve, is a vortical outlet orifice 18. The vortical outlet orifice 18 has a throat portion 19 with a rounded shoulder 21. In the direction of the outlet 12, the wall 22 diverges outwardly forming a diffuser section 23.

A vortical motion is imparted to fluid entering at tangential inlet 11 by means of the annular vortical chamber 16. Because of the rounded shoulders 21 of the vortical orifice 18, and also because of the diffuser section 23, the vortical flow tends to stay locked to the surface of 21 and 22, and the axial flow along the longitudinal centerline 17 is in the direction of the outlet 12. Additionally, the side of the vortical chamber 16 formed by the back plate 14 is canted inwardly towards the vortical orifice 18.

Downstream of the diffuser section 23, toward the outlet 12, the walls 27 converge inwardly towards the longitudinal center line 17 forming a pressure recovery section 26. In the diffuser section 23 most of the vortical motion will have been lost and converted into axial flow along the longitudinal centerline 17 in the direction of the outlet 12.

The operation of the vortex control valve of this invention may now be explained in connection with FIG. 3, which shows a set of idealized characteristic curves of the valve of this invention. Positive flow is in the direction of outlet 12, and negative flow is in the direction of outlet 13 along the longitudinal axis 17. The pressure represented is the pressure at the inlet 11. The control point, shown in FIG. 3, is the predetermined pressure where relief action starts. At pressures below the control point, the entire input to inlet 11 exits at outlet 12, as shown on the graph. If relief port 13 is unblocked, a low pressure region at the throat 19 of the vortical orifice 18, created by the vortical motion and the axial flow, will create a low pressure region and entrain flow from the relief port 13. This is shown in FIG. 3 as a positive flow at relief port 13 up to the control point. When operated below the control point, the valve 10 may be used as a vacuum converter. This also results, as is shown in FIG. 3, in having the flow from outlet 12 exceed the flow at inlet 11 up to the control point. When the pressure at inlet 11 exceeds a certain predetermined amount, such that the outlet 12 can no longer handle the flow, pressure builds up at outlet 11 and forces flow in the direction of the relief port 13. The point at which the flow at relief port 13 becomes negative is defined as the control point. Increased pressure beyond this control point results in increased flow from relief port 13 tending to limit the flow from outlet 12.

FIG. 4 shows the effect of varying the diameter D' of the relief port 13 with respect to the diameter D of the vortex orifice 18. FIG. 4 plots the flow at the relief port 13 for increasing inlet pressure at 11. Again, positive flow is in the direction of outlet 12, and negative flow is in the direction of the relief port 13. As can be seen, as the diameter D' of the relief port 13 decreases relative to the diameter D of the vortex orifice 18 the control point pressure increases.

FIG. 5 shows an alternate method of varying the control point at which the valve operates. The valve 30 is similar to the valve 10 shown and described in connection with FIG. 1. The embodiment of FIG. 5 is equipped with an adjustable sleeve 31 which forms the relief port. By moving the sleeve 31 in the direction of the outlet 33, the control point pressure is increased.

In order to insure maintenance of the vortex flow and to extend the range of the valve to higher pressures if desired, a convergent cone, such as shown in FIG. 7, may be used. The valve 50 of FIG. 7 has a convergent cone 51 held in place by a plurality of spiders 52 spaced around the periphery of the cone. The convergent cone 51 extends into the vortex outlet orifice 53 and prevents the vortical flow from breaking up. The angle $\theta$ of the cone 51 should be on the order of 70 to 35 degrees, and the shoulders 54 should be substantially parallel to the surface of the cone.

As can be seen, from an inspection of FIG. 1, by having the inlet 11 radially offset from the outlet 12, but having the outlet 12 and the relief port 13 in axial alinement, flow in the direction from inlet 11 to outlet 12 takes place without appreciable valve loss up to the control point. The major loss in this region is the enregy used to establish the vortical flow. However, even in the region below the control point, if the pressure at outlet 12 suddenly exceeds the pressure at inlet 11 tending to establish flow in the opposite direction, the direction of easy flow will be toward outlet 13. The loss, in this case, between outlet 12 and inlet 11 will be high. In this manner, the vortex control valve 10 serves to prevent backup of the system due to a change in the load at outlet 12.

Protection in the forward direction, that is from inlet 11 to outlet 12, from over pressures at the inlet 11 is readily seen from an inspection of FIG. 3 already discussed. Briefly, assuming a constant load at outlet 12, when the inlet pressure at 11 exceeds the control point pressure the over pressure is relieved through relief port 13.

The vortex control valve 10 of this invention may also be used, if desired, to establish proportional flow with no moving parts, as will be apparent to those skilled in the art from an inspection of FIG. 3. In this case, as for example where the flow is to be proportioned between two devices, the first device is connected to outlet 12, and the second device is connected to the relief port 13. For constant loads the flow will be divided between the two devices. Once established, the proportional flow will be steady without tendency to oscillate or switch from one outlet to the other.

FIG. 6 shows a schematic diagram illustrating the use of the valve 10 of this invention as back pressure valves to sequence the flow among a plurality of devices. Represented schematically are a series of vortex control valves 60, similar to the valve shown and described in connection with FIG. 1. Also shown are a series of cylinders 61 which are to be sequentially operated. An input is from lines 62 which feeds a first valve 60. The outlet for the first valve 60 exhausts through 63 and fills the first cylinder A. When the pressure in the first cylinder A builds up beyond a predetermined pressure, flow exists from the relief port of the valve 60 and out line 64, which serves as the input to the succeeding valve. The second cylinder B is operated over line 65 until the pressure again exceeds a predetermined amount, and the flow then exits from 66 to operate cylinder C. In this way any number of cylinders may be sequentially operated. Of course, if only two cylinders are to be operated, only one valve is necessary and the relief port can directly feed the second cylinder.

It will be apparent that the embodiment shown is only exemplary and that various modifications can be made in construction and arrangement within the scope of the invention as defined in the appended claims.

I claim as my invention:

1. A vortex control valve having no moving parts comprising:
    (a) a valve body having a longitudinal axis,
    (b) outlet means and relief port means coaxially disposed along said longitudinal axis,
    (c) an annular vortical chamber coaxially disposed with said outlet means and said control port means, and a tangential inlet means in said vortical chamber,
    (d) a vortical orifice in one wall of said vortical chamber coaxially disposed with said outlet means and said relief port means, and disposed between them,
    (e) said relief port means disposed in the other wall of said vortical chamber,
    (f) said vortical orifice having rounded shoulders forming a throat section with said one wall diverging in the direction away from said relief port forming a diffusing section,
    (g) pressure recovery means connected to said diffuser section, and said outlet means connected to said pressure recovery section whereby flow introduced at said inlet means tends to exit at said outlet means and flow introduced at said outlet means tends to exit at said relief port means.

2. A vortex control valve as in claim 1 wherein said relief port means includes a sleeve portion which is movable in the direction of said outlet means, whereby the relief pressure of said valve may be varied.

3. A vortex control valve as in claim 1 including a convergent cone extending into said vortical orifice.

References Cited by the Examiner

UNITED STATES PATENTS

| | | | |
|---|---|---|---|
| 1,517,598 | 12/1924 | Stevenson | 137—604 |
| 2,653,801 | 9/1953 | Fontein et al. | |
| 3,039,490 | 6/1962 | Carlson | 137—81.5 |
| 3,064,811 | 11/1962 | Mumper. | |
| 3,075,227 | 1/1963 | Bowles. | |

FOREIGN PATENTS

| | | |
|---|---|---|
| 1,291,299 | 3/1962 | France. |
| 211,815 | 7/1909 | Germany. |

OTHER REFERENCES

Journal of the A.S.R.E., February 1950, "An Analysis of the Hilsch Vortex Tube," p. 163.

M. CARY NELSON, *Primary Examiner.*

LAVERNE D. GEIGER, *Examiner.*